T. C. GARLINGTON.
Seed-Planters.
No. 135,704.
Patented Feb. 11, 1873.
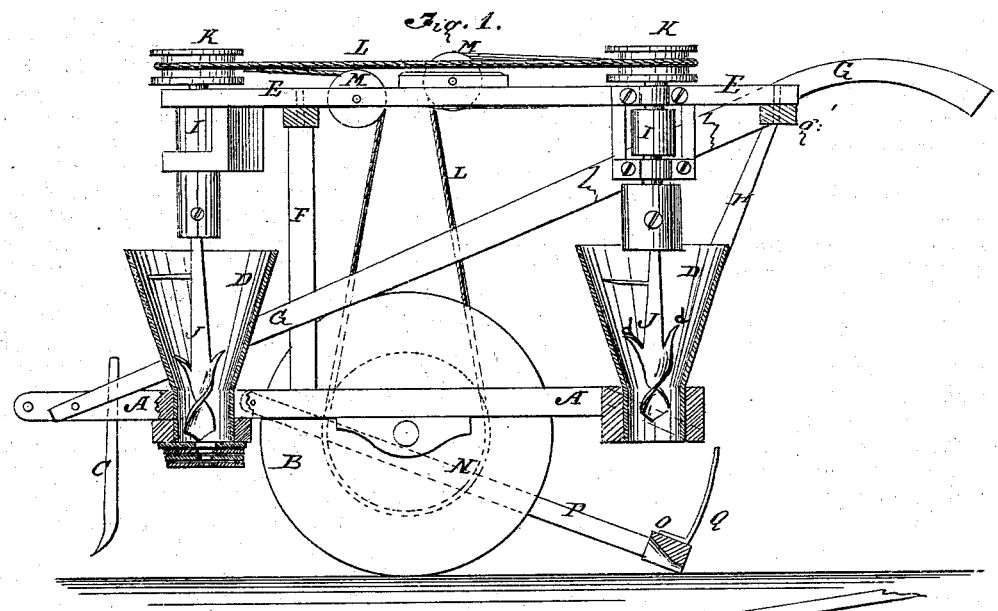
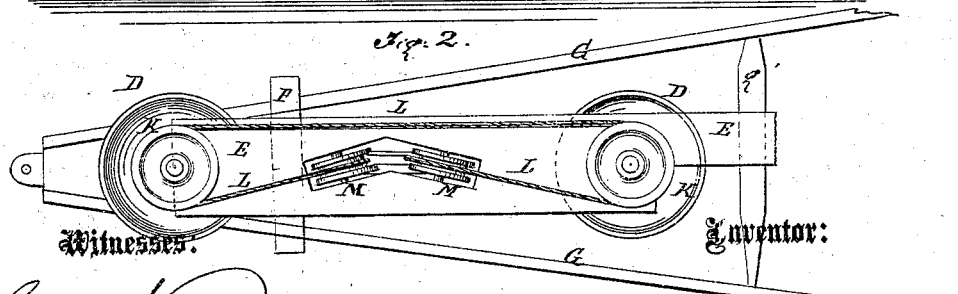

UNITED STATES PATENT OFFICE.

THOMAS C. GARLINGTON, OF LA FAYETTE, ALABAMA.

IMPROVEMENT IN SEED-PLANTERS.

Specification forming part of Letters Patent No. 135,704, dated February 11, 1873.

*To all whom it may concern:*

Be it known that I, THOMAS C. GARLINGTON, of La Fayette, in the county of Chambers and State of Alabama, have invented an Improved Seed-Planter, of which the following is a specification:

Figure 1 is a side view of seeder arranged with a double hopper. Fig. 2 is a top view of the same.

The invention consists in an improvement of seed-planters, as hereinafter fully described and pointed out in claim.

A is the main frame of the machine; B, the drive-wheel; and C is the opening-plow, the standard of which passes up through and is adjustably secured to the forward part of the frame A. D are the seed-hoppers, which are made funnel-shaped, and two of which are used—one at the forward and the other at the rear end of the frame A. One of said hoppers is intended for sound seed, and the other for rotten seed or other fertilizer. E is a horizontal bar or frame, the forward end of which is secured to the top bar of an upright frame, F, attached to the main frame A. The rear end of frame E is secured to the cross-bar $g'$ of the handles G. The forward end of the handles G are secured to the sides of the forward end of the frame A, and are supported at the proper height by the uprights H, attached to the rear part of the frame A. To the front and rear ends of the frame E are swiveled the short shafts I, in the lower ends of which are formed sockets to receive the shafts of the stirrers J, which enter and work in the hoppers D. The lower parts of the stirrers J are made like augers, and to their shafts are attached fingers, which are made of the same curve as the thread of the auger-like part, so that they may clean themselves as they revolve. To the upper ends of the shafts I are attached pulleys K, around which passes a band, L, which passes down around guide-pulleys M attached to the middle part of the bar or frame E, and around the pulley N attached to the side of the drive-wheel B, so that the stirrers may be driven by the advance of the machine. O is the covering-block, the lower side of which is concaved to round up and give a proper form to the top of the ridge. The covering-block O is attached to the rear ends of the spring-bars P, the forward ends of which are attached to the forward part of the frame A. To the upper side of the covering-block O are attached two plows, Q, so that, when the soil is unsuitable for the block O to cover the seeds, the coverer O P Q may be reversed, and the covering done by the plows Q, the block O and plows Q each serving as a weight to hold the other down to its work.

Having thus described my invention, what I claim as new, and desire to secure by Letters Patent, is—

The auger-stirrer J, having side fingers $d\ d$, spirally bent to correspond to thread of auger, as and for the purpose set forth.

THOMAS C. GARLINGTON.

Witnesses:
V. H. CELLIER,
T. J. MARTIN.